United States Patent
Kelly et al.

(10) Patent No.: US 8,290,919 B1
(45) Date of Patent: Oct. 16, 2012

(54) SYSTEM AND METHOD FOR DISTRIBUTING AND ACCESSING FILES IN A DISTRIBUTED STORAGE SYSTEM

(75) Inventors: Sean A. Kelly, Boulder, CO (US); Roger B. Milne, Boulder, CO (US)

(73) Assignee: Disney Enterprises, Inc., Burbank, CA (US)

( * ) Notice: Subject to any disclaimer, the term of this patent is extended or adjusted under 35 U.S.C. 154(b) by 82 days.

(21) Appl. No.: 12/870,739

(22) Filed: Aug. 27, 2010

(51) Int. Cl.
*G06F 7/00* (2006.01)
*G06F 17/00* (2006.01)

(52) U.S. Cl. . 707/698; 707/747; 707/968; 707/E17.032; 707/E17.036; 707/E17.052; 709/203; 709/214; 709/218

(58) Field of Classification Search ............... 707/770, 707/966, 968, E17.032, E17.124, E17.125, 707/698, 747, E17.036, E17.052; 709/203, 709/214, 215, 218; 714/6; 711/114, 118, 711/129, 152
See application file for complete search history.

(56) References Cited

U.S. PATENT DOCUMENTS

| | | | |
|---|---|---|---|
| 4,290,105 A * | 9/1981 | Cichelli et al. | 707/999.005 |
| 4,972,472 A | 11/1990 | Brown et al. | |
| 5,790,447 A | 8/1998 | Laudon et al. | |
| 5,960,431 A * | 9/1999 | Choy | 707/999.2 |
| 6,049,476 A | 4/2000 | Laudon et al. | |
| 6,058,400 A | 5/2000 | Slaughter | |
| 6,070,254 A | 5/2000 | Pratt et al. | |
| 6,104,963 A | 8/2000 | Cebasek et al. | |
| 6,253,193 B1 | 6/2001 | Ginter et al. | |
| 6,363,488 B1 | 3/2002 | Ginter et al. | |
| 6,389,402 B1 | 5/2002 | Ginter et al. | |
| 6,393,466 B1 | 5/2002 | Hickman et al. | |
| 6,427,140 B1 | 7/2002 | Ginter et al. | |
| 6,438,705 B1 | 8/2002 | Chao et al. | |

(Continued)

FOREIGN PATENT DOCUMENTS

WO 2010463993 4/2010

OTHER PUBLICATIONS

M. Aris Ouksel and Otto Mayerl—"The Nested Interpolation Based Grid File"—MFDBS 91 Lecture Notes in Computer Science, 1991, vol. 495/1991, (pp. 173-187), DOI: 10.1007/3-540-54009-1_13.*

(Continued)

*Primary Examiner* — Jean B Fleurantin
*Assistant Examiner* — Anh Ly
(74) *Attorney, Agent, or Firm* — Patterson & Sheridan, LLP

(57) ABSTRACT

A system and method for distributing and accessing files in a distributed storage system uses an ordered list of the storage nodes in the system to determine the storage node on which a file is stored. The distributed storage system includes a cluster of storage nodes and may also include one or more client nodes that participate in the system as storage resources. Each node (client and storage) stores an ordered list of the storage nodes in the system, allowing any of the nodes to access the file. The list is updated whenever a new storage node is added to the system, an existing storage node is removed from the system, or a new storage node is swapped with an existing storage node. Each one of the nodes may independently compute a new mapping of files to the storage nodes when the ordered list is changed.

18 Claims, 10 Drawing Sheets

U.S. PATENT DOCUMENTS

| | | |
|---|---|---|
| 6,470,344 B1 | 10/2002 | Kothuri et al. |
| 6,523,130 B1 | 2/2003 | Hickman et al. |
| 6,564,252 B1 | 5/2003 | Hickman et al. |
| 6,745,286 B2 * | 6/2004 | Staub et al. ............... 711/114 |
| 6,829,610 B1 | 12/2004 | Hickman et al. |
| 6,917,967 B2 | 7/2005 | Wu et al. |
| 6,988,173 B2 | 1/2006 | Blake et al. |
| 7,054,910 B1 | 5/2006 | Nordin et al. |
| 7,054,927 B2 * | 5/2006 | Ulrich et al. ............... 709/223 |
| 7,085,898 B2 | 8/2006 | Blake et al. |
| 7,111,130 B2 | 9/2006 | Blake et al. |
| 7,120,690 B1 | 10/2006 | Krishnan et al. |
| 7,139,925 B2 | 11/2006 | Dinker et al. |
| 7,159,070 B2 * | 1/2007 | Kilian et al. ............... 711/108 |
| 7,197,632 B2 | 3/2007 | Rao et al. |
| 7,269,648 B1 | 9/2007 | Krishnan et al. |
| 7,277,952 B2 | 10/2007 | Nishanov et al. |
| 7,624,155 B1 | 11/2009 | Nordin et al. |
| 7,685,109 B1 * | 3/2010 | Ransil et al. ........... 707/999.003 |
| 7,730,207 B2 * | 6/2010 | Zhang et al. ............... 709/203 |
| 7,730,258 B1 | 6/2010 | Smith et al. |
| 7,797,393 B2 | 9/2010 | Qiu et al. |
| 2004/0098447 A1 * | 5/2004 | Verbeke et al. ............... 709/201 |
| 2004/0128587 A1 * | 7/2004 | Kenchammana-Hosekote et al. ............... 714/43 |
| 2004/0215639 A1 | 10/2004 | Bamford et al. |
| 2004/0215640 A1 * | 10/2004 | Bamford et al. ............... 707/100 |
| 2006/0206662 A1 | 9/2006 | Ludwig et al. |
| 2007/0156842 A1 * | 7/2007 | Vermeulen et al. ........... 709/217 |
| 2008/0198177 A1 * | 8/2008 | Niemi et al. ............... 345/660 |
| 2009/0271412 A1 * | 10/2009 | Lacapra et al. ............... 707/10 |
| 2010/0031162 A1 | 2/2010 | Wiser et al. |
| 2010/0050109 A1 * | 2/2010 | Kaliki et al. ............... 715/780 |
| 2011/0258391 A1 * | 10/2011 | Atkisson et al. ............... 711/118 |

OTHER PUBLICATIONS

George Forman, Kaye Eshghi and Stephane Chiocchetti—"Finding Similar Files in Large Document Repositories"—KDD'05, Aug. 21-24, 2005, Chicago, Illinois, USA. Copyright 2005 ACM—Proceedings of the eleventh ACM SIGKDD international conference on Knowledge discovery in data mining—Industry/Government Track Paper (pp. 394-400).*

* cited by examiner

Partition to Storage Node Mapping 205

|  | Primary Node | Secondary Node | Tertiary Node |
|---|---|---|---|
| Partition 1 | Node 1 | Node 2 | Node 3 |
| Partition 2 | Node 2 | Node 3 | Node 4 |
| Partition 3 | Node 3 | Node 4 | Node 5 |
| Partition 4 | Node 4 | Node 5 | Node 6 |
| Partition 5 | Node 5 | Node 6 | Node 7 |
| Partition 6 | Node 6 | Node 7 | Node 8 |
| Partition 7 | Node 7 | Node 8 | Node 9 |
| Partition 8 | Node 8 | Node 9 | Node 1 |
| Partition 9 | Node 9 | Node 1 | Node 2 |

Figure 2B

Node to Partition Mapping 345

|  | Primary Node | Secondary Node | Tertiary Node |
|---|---|---|---|
| Partition 1 | Node 1 | Node 2 | Node 3 |
| Partition 2 | Node 2 | Node 3 | Node 4 |
| Partition 3 | Node 3 | Node 4 | Node 5 |
| Partition 4 | Node 4 | Node 5 | Node 6 |
| Partition 5 | Node 5 | Node 6 | Node 7 |
| Partition 6 | Node 6 | Node 7 | Node 8 |
| Partition 7 | Node 7 | Node 8 | Node 9 |
| Partition 8 | Node 8 | Node 9 | Node 10 |
| Partition 9 | Node 9 | Node 10 | Node 2 |
| Partition 10 | Node 10 | Node 1 | Node 2 |

Figure 3B

SYSTEM AND METHOD FOR DISTRIBUTING AND ACCESSING FILES IN A DISTRIBUTED STORAGE SYSTEM

BACKGROUND

1. Field of the Invention

The present invention relates to the field of distributed storage systems and, in particular, to a system and method for distributing and accessing files in a distributed storage system.

2. Description of the Related Art

Existing distributed storage systems are designed to depend on specific types of hardware for the storage, requiring homogeneous hardware to simplify administration and configuration of the system. Some storage systems rely on a centralized server or designated control servers to monitor the distributed storage systems, to configure new storage servers, and to propagate updates to the storage servers. Still other storage systems use heterogeneous hardware and require heterogeneous software, such as client-server systems that use the glusterFS storage platform. Many of the existing distributed storage systems cannot be easily scaled up or down in size and have significant administrative costs due to the complexity of reconfiguring the system.

As the foregoing illustrates, there is a need in the art for an improved distributed storage systems that can be easily scaled up or down in size and do not rely on a centralized server to configure or reconfigure the distributed storage system. Additionally, it is desirable to use identical software on all of the hardware in the distributed storage system.

SUMMARY

Embodiments of the invention include a system and method for distributing and accessing files in a distributed storage system that includes a cluster of storage nodes and may also include one or more client nodes that participate in the system as non-storage resources. Each node (client and storage) stores an ordered list of the storage nodes in the system. This list is used to determine the storage node on which a particular file is stored, allowing any of the nodes to access the file. The list is updated whenever a new storage node is added to the system or an existing storage node is removed from the system.

One embodiment of the invention provides a computer-implemented method for accessing files that are distributed across multiple storage nodes in a distributed storage system. The method includes receiving a filename associated with a first distributed file with an access request and extracting, based on the filename, a bucket identifier of a bucket that stores a portion of the distributed files, where the portion includes the first distributed file. A first storage node that stores the first distributed file is determined based on a mapping of the bucket to the multiple storage nodes. Then a request is dispatched to the first storage node to access the first distributed file.

One advantage of the techniques described herein is that the administrative operations for adding, removing, and swapping storage nodes are simplified through the use of the ordered list. Each one of the nodes may independently compute a new mapping of files to the storage nodes when the ordered list is changed (following reliable communication of the change to the nodes). Consequently there is no need for any centralized administrative node(s), and the different nodes may include heterogeneous hardware. Additionally, the system may be scaled up or down in size while operations continue, and the volume of data transfers needed to complete the redistribution of data as the system is reconfigured is minimized. The files are distributed to different storage nodes in the system using the computed mapping, and the mapping requires minimal file transfers when a new storage node is added or when an existing storage node is removed.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2B is a table of partitions mapped to one or more storage nodes of the distributed storage system, according to one embodiment of the invention.

FIG. 3B is another table of partitions mapped to one or more storage nodes of the distributed storage system, according to one embodiment of the invention.

DETAILED DESCRIPTION OF EXEMPLARY EMBODIMENTS

Figure 1:
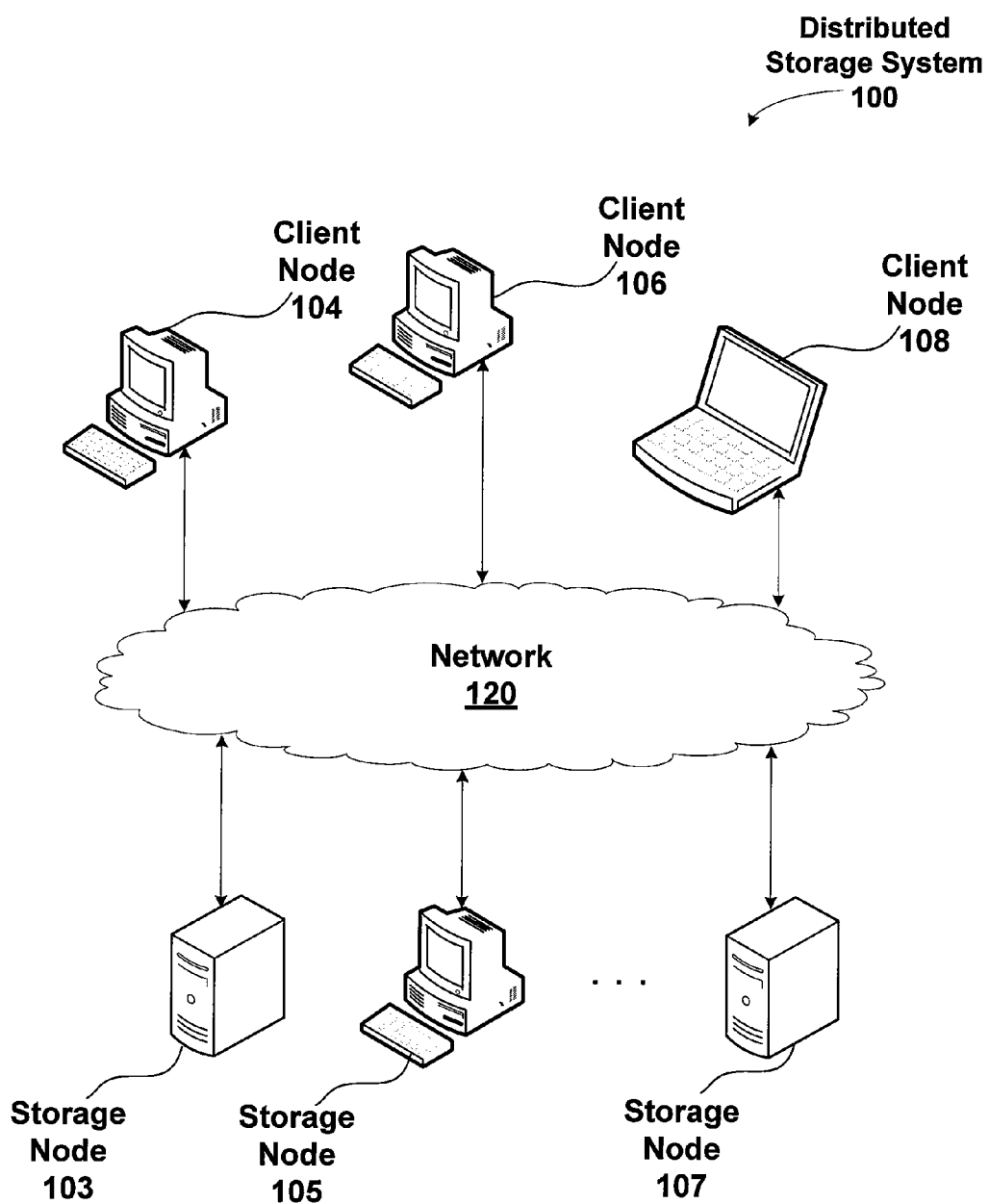
FIG. 1 is a block diagram of a system configured to implement one or more aspects of the present invention.

FIG. 1 is a block diagram of a distributed storage system 100 configured to implement one or more aspects of the present invention. The distributed storage system 100 includes a cluster of storage nodes 103, 105, and 107 and also includes client nodes 104, 106, and 108 that participate in the system as non-storage resources. Files stored on the storage nodes 103, 105, and 107 may be accessed by any of the client nodes 104, 106, 108 and by any of the storage nodes 103, 105, and 107. Each node (client and storage) stores an ordered list of the storage nodes in the distributed storage system 100.

The distributed file system 100 is designed to manage arbitrarily large quantities of data using off the shelf hardware and includes facilities for transparent replication of written data and fault tolerance read access. The distributed file system 100 may be used to store user generated content (UGC), and to scale under the storage of millions of files of small to medium size (a kilobyte to a few megabytes each). While the hardware for the storage nodes 103, 105, and 107 and the client nodes 104, 106, 108 may be heterogeneous, the software that performs the administrative operations and maintains the ordered list of the storage nodes may the same for the client nodes 104, 106, 108 and the storage nodes 103, 105, and 107. The software may be stored in a memory and executed by a suitable instruction execution system (microprocessor). The software comprises sequence of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

The storage and client nodes 103, 104, 105, 106, 107, and 108 are coupled together via a data communications network 120. Although devices are illustrated, different numbers (either greater or fewer) may be included in the distributed storage system 100. The network 120 represents any of a wide variety of data communications networks. Network 120 may include public portions (e.g., the Internet) as well as private portions (e.g., an internal corporate Local Area Network (LAN)), as well as combinations of public and private portions. Network 120 may be implemented using any one or more of a wide variety of conventional communications media including both wired and wireless media. Any of a wide variety of communications protocols can be used to communicate data via network 120, including both public and proprietary protocols. Examples of such protocols include TCP/IP, IPX/SPX, NetBEUI, etc.

The storage and client nodes 103, 104, 105, 106, 107, and 108 represent any of a wide range of computing devices, and each device may be the same or different. By way of example, storage and client nodes 103, 104, 105, 106, 107, and 108 may be workstations, servers, desktop computers, laptop computers, handheld or pocket computers, personal digital assistants (PDAs), cellular phones, Internet appliances, consumer electronics devices, gaming consoles, and so forth. The storage and client nodes participating in the distributed storage system 100 can change over time, allowing new storage and/or client nodes to be added to the system and other storage and/or client nodes to be removed from the system. Each storage node 103, 105, and 107 that participates in the distributed storage system has portions of its mass storage device (s) (e.g., hard disk drive) allocated for use as distributed storage. Each client node 102, 104, and 106 that participates in the distributed storage system may include a mass storage device, but that storage is not allocated for use as distributed storage. Each storage and client node 103, 104, 105, 106, 107, and 108 may also include local storage that is used for data that a user desires to store on his or her local machine and not in the distributed storage. The distributed storage portion is used for data that the user of the device (or another device) desires to store within the distributed storage.

The distributed storage system 150 operates to store one or more copies of files on different storage node 103, 105, and 107. When a new file is created by the user of a client node 102, 104, and 106, the file is stored on the local portion of his or her client node 102, 104, and 106, and then a transfer to one or more of the storage node(s) 103, 105, and 107 in the distributed storage system 100 is initiated. The user creating the file typically has no ability to control which storage node (s) 103, 105, and 107 the file is stored on, nor any knowledge of which storage node(s) 103, 105, and 107 the file is stored on. Additionally, redundant (replicated) copies of the file may be stored on storage node(s) 103, 105, and 107, allowing the user to subsequently retrieve the file even if one of the storage node(s) 103, 105, and 107 on which the file is saved is unavailable (e.g., is powered-down, is malfunctioning, etc.).

The distributed storage system 100 is implemented by each of the storage and client node 103, 104, 105, 106, 107, and 108, thereby obviating the need for any centralized server to manage adding new nodes, removing nodes, replacing nodes, or otherwise reconfiguring the storage system. Each storage and client node 103, 104, 105, 106, 107, and 108 operates to determine where particular files are stored, how many copies of the files are created for storage on different storage nodes, and so forth. Exactly which storage node 103, 105, or 107 will store a particular file may be independently and deterministically computed by each one of the storage and client nodes 103, 104, 105, 106, 107, and 108 and the distributed storage appears to the user as opaque. Thus, the distributed storage system 100 allows the user to create and access files (as well as folders or directories) while client and/or storage nodes are added, replaced, or removed from the distributed storage system 100.

File Distribution

With the techniques described herein, files may be more or less (substantially) evenly distributed to multiple (conceptual) buckets that are stored in the distributed storage system 100. The number of buckets is typically a power of two value, i.e., $2^i$, where i is an integer. However, other values are also possible. In one embodiment, a hash function is used to distribute the files between the different buckets and produce a balanced distribution. The buckets are indirectly mapped to the storage nodes through partitions. The mapping of the buckets to the partitions distributes the buckets over the storage nodes such that the amount of redistribution required in the event of a configuration update, e.g., addition or removal of a storage node, is minimal. When redundancy is not used, each partition is mapped to a single storage node and when redundancy is used, each partition is mapped to two or more storage nodes. The number of buckets may be greater than the number of storage nodes and each bucket may store multiple files.

Figure 2A:
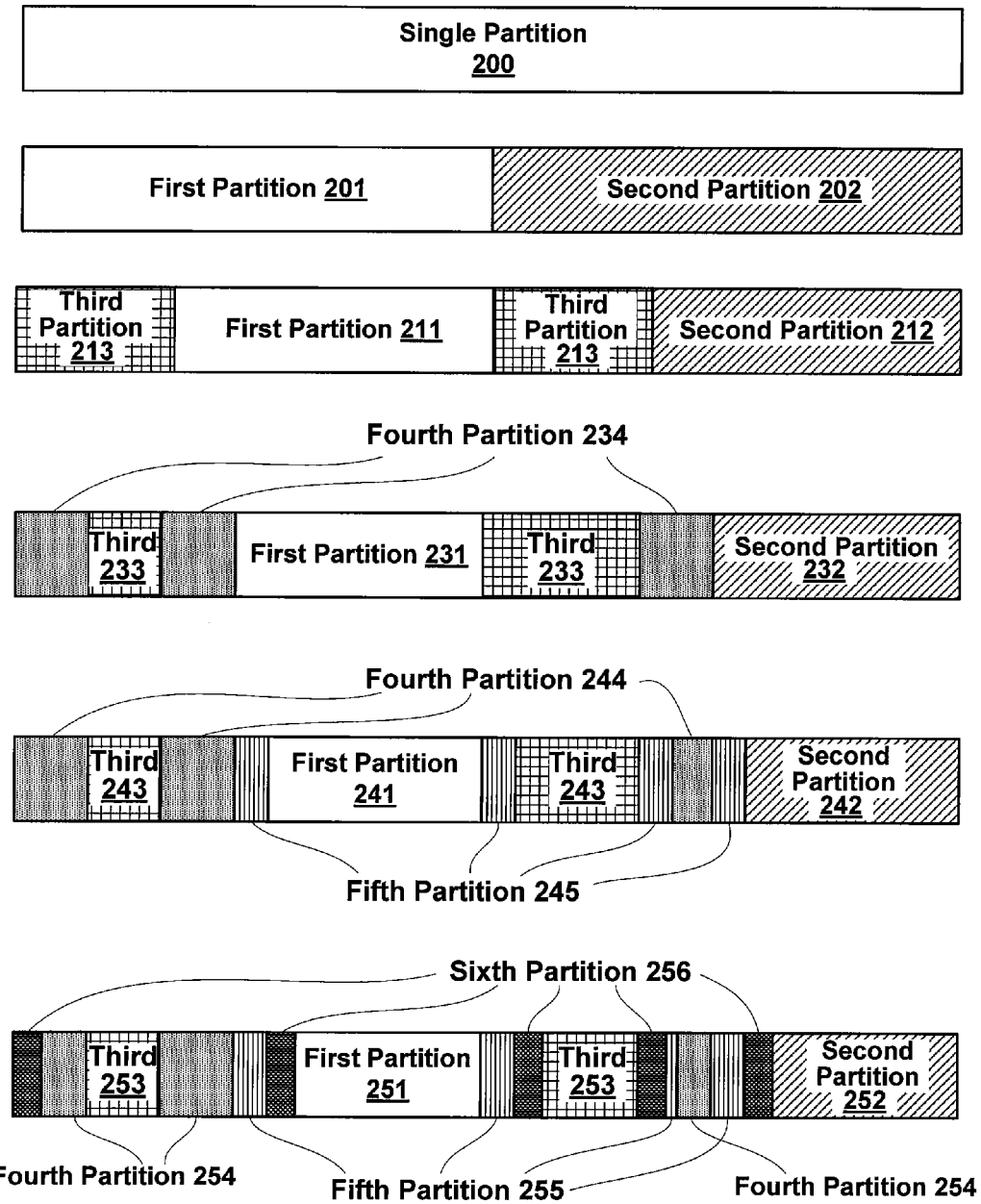
FIG. 2A is a conceptual diagram of buckets mapped to one or more partitions of the distributed storage system, according to one embodiment of the invention.

FIG. 2A is a conceptual diagram of buckets mapping to one or more partitions of the distributed storage system 100, according to one embodiment of the invention. The mapping function is deterministic in the same distribution of the files is produced for a specific set of input values, e.g., number of partitions, buckets, and levels of redundancy. Each horizontal bar represents the bucket space from 1 at the left to $2^N$ at the right, where N is an integer number of buckets. The number of partitions increases for each horizontal bar shown in FIG. 2A, moving from top to bottom. When a single partition 200 is used, all of the buckets are mapped to the single partition 200.

When two partitions are used (a first partition 201 and a second partition 202), approximately half of the buckets are mapped to the first partition 201 and the remaining half of the buckets are mapped to the second partition 202. Note that when a single partition or only two partitions are used the buckets are mapped to contiguous partitions. As the number of partitions increases, the buckets are mapped to more fragmented partitions.

When three partitions are used (a first partition 211, a second partition 212, and a third partition 213), approximately one-third of the buckets are mapped to each one of the three partitions 211, 212, and 213. The first partition 211 and the second partition 212 are contiguous in the bucket space and the third partition 213 is fragmented in the bucket space. When four partitions are used (a first partition 231, a second partition 232, a third partition 233, and a fourth partition 234), approximately one-quarter of the buckets are mapped to each one of the four partitions 231, 232, 233, and 234. The first partition 231 and the second partition 232 are contiguous in the bucket space and the third partition 233 and the fourth partition 234 are fragmented in the bucket space.

When five partitions are used (a first partition 241, a second partition 242, a third partition 243, a fourth partition 244, and a fifth partition 245), approximately one-fifth of the buckets are mapped to each one of the five partitions 241, 242, 243, 244, and 245. The first partition 241 and the second partition 242 are contiguous in the bucket space and the third partition 243, the fourth partition 244, and the fifth partition 245 are fragmented in the bucket space. When six partitions are used (a first partition 251, a second partition 252, a third partition 253, a fourth partition 254, a fifth partition 255, and a sixth partition 256), approximately one-sixth of the buckets are mapped to each one of the six partitions 251, 252, 253, 254, 255, and 256. The first partition 251 and the second partition 252 are contiguous in the bucket space and the third partition 253, the fourth partition 254, the fifth partition 255, and the sixth partition 256 are fragmented in the bucket space.

As the number of partitions increases, fragmenting the partitions across the bucket space provides for a more even distribution of the buckets (and files) and improved load balancing. The improved load balancing results from file accesses being spread across multiple storage nodes rather than being concentrated on a single storage node when each partition maps to a single storage node or concentrated on a group of R storage nodes when R-way redundancy is used. The number of partitions increases or decreases as storage nodes are added to or removed from the distributed storage system or when the redundancy is changed. The particular pattern in which the buckets are mapped as the number of partitions increases and decreases minimizes the transfer of data between the different partitions (or storage nodes), as further described in conjunction with FIGS. 3A and 3B.

In order to determine which storage node stores a file, a mapping of the partitions to the storage nodes is combined with the mapping of the buckets to the partitions to map each file to a particular storage node (or to multiple storage nodes when redundancy is used). FIG. 2B is a table illustrating a partition to storage node mapping 205 for a distributed storage system including nine storage nodes, according to one embodiment of the invention. As shown, three-way redundancy is being used, i.e., each file is stored on three different storage nodes, a primary node, secondary node, and a tertiary node. A file is preferably read from the primary node and written to the primary, secondary, and tertiary nodes. A bucket mapped to partition P is stored to the primary storage node (P modulo K), where K is the number of storage nodes (9 in this example) and P is the number of partitions (also 9 in this example). The same bucket in partition P is stored to the secondary storage node (P+1 modulo K) and to the tertiary storage node (P+2 modulo K). Only the primary storage nodes are read and written when redundancy is not used.

Figure 2C:
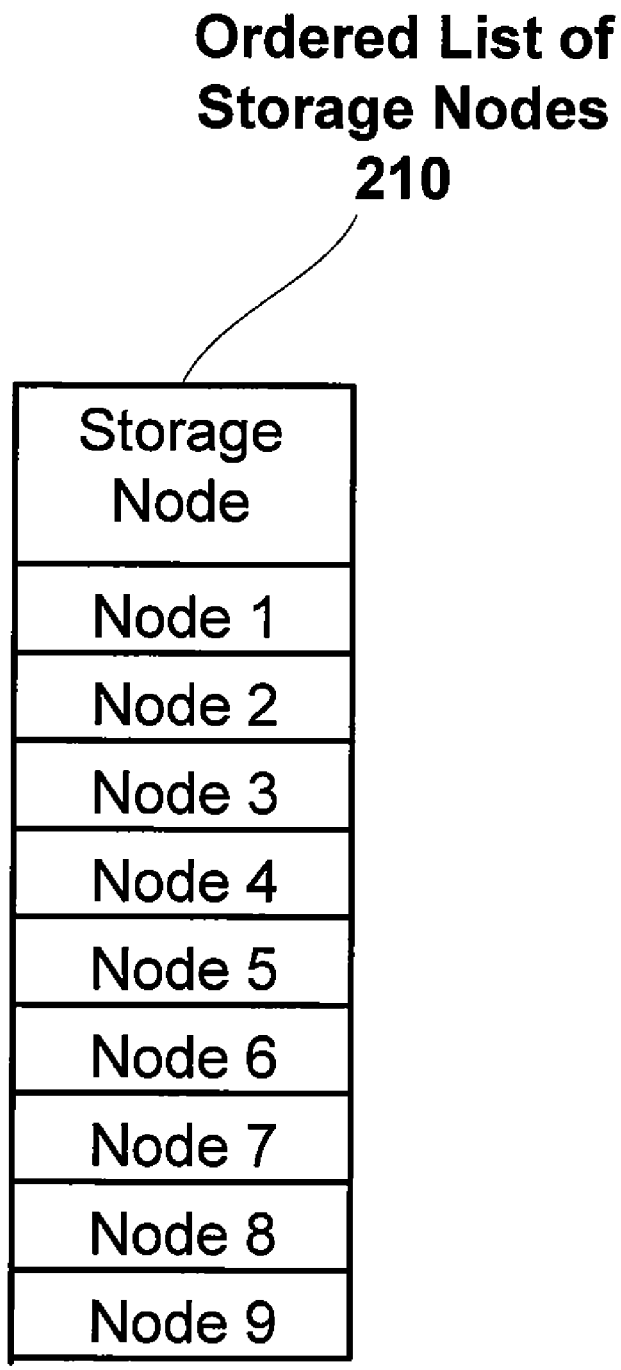
FIG. 2C is an ordered list of the storage nodes, according to one embodiment of the invention.

FIG. 2C is an ordered list of the storage nodes 210, according to one embodiment of the invention. The ordered list of the storage nodes 210 includes nine storage nodes with storage node 1 at the top of the list, storage node 9 at the bottom of the list, and nodes 2 through 8 in sequence between node 1 and node 9. The very first time a distributed storage system is initialized, the ordered list is provided to the nodes by a specific command that may be issued from an administration tool.

Figure 2D:
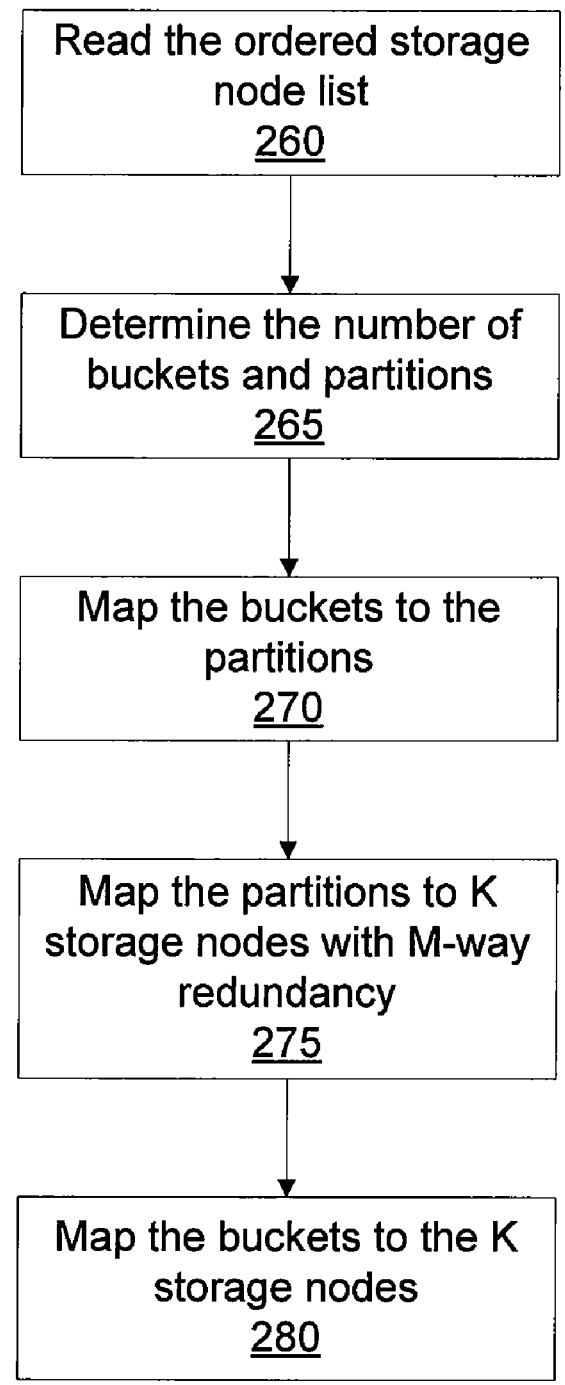
FIG. 2D is a flowchart of method steps for mapping of the buckets to the storage nodes, according to one embodiment of the invention.

FIG. 2D is a flowchart of method steps for mapping the buckets to the storage nodes, according to one embodiment of the invention. At step 260, a client node or storage node reads the ordered storage node list that is stored locally. At step 265, the client node or storage node determines the number of buckets and partitions. Static configuration information for the distributed storage system that is provided to each of the client and storage nodes may specify the number of buckets and the redundancy level, R. At step 270, the buckets are mapped to the partitions using an iterative algorithm. Given a logically ordered list of K nodes, the iterative algorithm is used by each client or storage node to deterministically compute the mapping from buckets to partitions. The deterministic nature of bucket to partition mapping calculation, and the fact that it is derived from a compact state definition, leads to a simple mechanism to administer the storage cluster in a fully distributed fashion, i.e., without any specialized or administrative nodes. Examples of the distributed mapping of $2^N$ buckets to one to six partitions are shown in FIG. 2A.

At step 275, the partitions are mapped to the K storage nodes with R-way redundancy. An example of mappings of nine partitions to nine storage nodes for 1, 2, and 3-way redundancy is shown in FIG. 2B. At step 280, the mapping of buckets to partitions and partitions to storage nodes may be combined to produce the mapping of buckets to the K storage nodes. Each client and storage node may locally store the mapping generated in one or more of steps 270, 275, and 280 rather than regenerating the mapping each time a file is accessed. However, when either the number of partitions or storage nodes is increased or decreased, one or more of the mapping is recomputed by each one of the client and storage nodes.

Figure 2E:
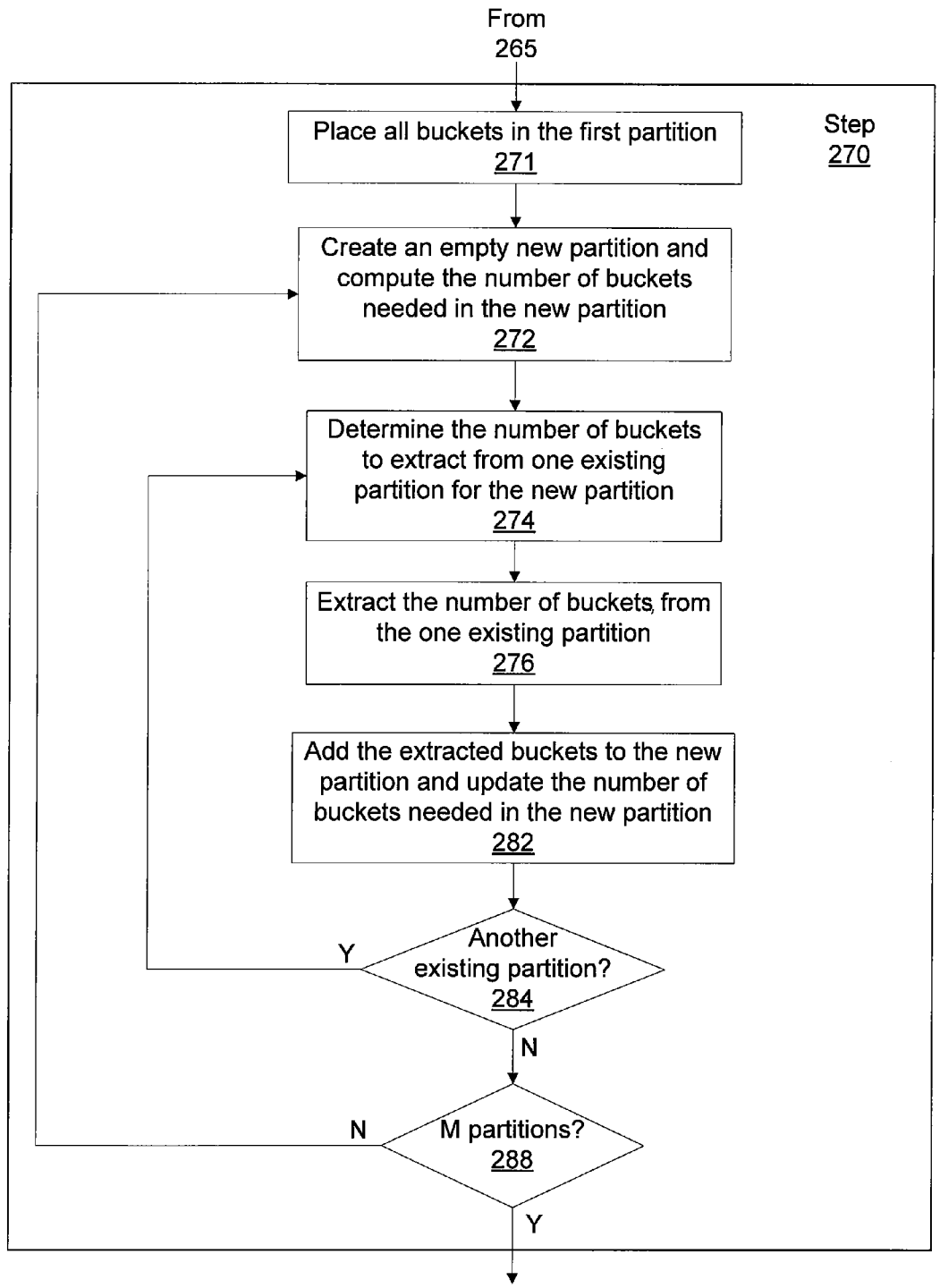
FIG. 2E is a flowchart of method steps for mapping of the buckets to the partitions, according to one embodiment of the invention.

FIG. 2E is a flowchart of method steps for step 270 of FIG. 2D, according to one embodiment of the invention. A partitioning of N buckets onto M partitions, Part(N,M) is defined as follows. The buckets are identified with the integers [0, N−1] (i.e., $Z_N$), and the partitioning of this set of integers onto M partitions as equivalent to the bucket partitioning. The partitioning consists of an ordered list of length M, with each element of the list consisting of a set of non-overlapping segments. A segment is defined as a contiguous interval of integers, [a,b] that is a subset of the [0, N−1] buckets. Thus an example partitioning might be written as:

[{[a0,b0]}, {[a1,b1]}, {[a2,b2],[a3,b3]}].

Here the partitioning has M=3, and the ordered list of sets contain 1, 1, and 2 segments, respectively. Each segment contains one or more buckets.

At step 271 all of the buckets are place in the first partition, Part(N,1)=[{[0,N−1]}]. When only one partition is used the partitioning is complete. The steps shown in FIG. 2E are performed when there are at least two partitions. New partitions are successively added one at a time until the desired number of partitions, M are present. When each new partition is added, buckets are extracted from the (successively increasing number of) existing partitions and placed into each new partition. At step 272 an empty new partition is created. At step 272 the number of buckets needed in the new partition is computed is floor(N/k), where k is the number of existing partitions that starts at 2 and is successively increased to M. Therefore, the first time step 272 is executed, the number of buckets needed in the new (second) partition is computed as N/2. The number of buckets that are needed in the new partition will be extracted from the existing partitions.

At step 274 the number of buckets to extract from one of the existing partitions for the new partition is determined. Steps 274, 276, and 282 are repeated for each one of the existing partitions when a new partition is added. When the second partition is added as the new partition, the only existing partition is the first partition. The number of buckets to extract that is determined in step 274 is N/2. The number of buckets to extract may be rounded up or truncated. Additionally, the number of buckets to extract from a particular existing partition may be increased or decreased by one bucket when the existing partition has more buckets than other existing partitions. The number of buckets in the existing partitions will not be equal when N/M is not an integer. Increasing and decreasing the number of buckets to extract for an existing partition in step 282 ensures that the number of buckets in each of the partitions is substantially equal, i.e., within one or two buckets.

At step 276 the number of buckets is extracted from the one existing partition. In one embodiment, the segments in the one partition are ordered from largest to smallest, i.e., greatest number of buckets to smallest number of buckets. Example segments in one partition are shown in FIG. 2A as a first segment of the third partition 213 and a second segment of the third partition 213. Segments are successively extracted until the number of buckets extracted equals or exceeds the number of buckets determined in step 274. When the last segment to be extracted is larger than what is needed, the last segment is split into two segments, one of which is extracted and the other which remains in the existing partition.

At step 282 the buckets that were extracted from the one existing partition are added to the new partition and the number of buckets needed in the new partition (computed in step 272) is updated, i.e., decremented by the number of extracted buckets. At step 284, the client or storage node determines if there is another existing partition, and, if so, the client or storage node returns to step 282 to extract buckets from the next existing partition for the new partition. When, at step 284 the client or storage node determines that there is not another existing partition, i.e., buckets have been extracted from each one of the existing partitions and added to the one new partition, the client or storage node proceeds to step 288. At step 288 addition of one new partition is complete, and the client or storage node determines if the N buckets have been distributed (mapped) each one of the M partitions. When M partitions exist, at step 288, then the client or storage node proceeds to step 275. Otherwise, the client or storage node returns to step 272 to create another new partition.

The iterative mapping algorithm may be embodied as a program. In such a program $P_i$ (for i=0, ... M−1) is used to denote the M partitions that define Part(N,M), where each one of the M partitions corresponds to a set of segments. $S_{ij}$ is used to denote the segments that compose each $P_i$, i.e. $P_i=\{S_{i1}, S_{i2}, \ldots\}$. The partitioning, Part(N,M) may be defined using the code shown in TABLE 1, where k is an integer ranging in value from 2 to M.

TABLE 1

```
// First partitioning all buckets to a single partition
P1 = [ {[0, N−1]} ]
// build the k'th partitioning from the k−1 partitioning
// until there are M partitions in the final iteration for
// (k = 2 to M)
// The number of buckets per partition for this iteration
    n_needed = floor(N/k)
// The average number of buckets per existing partition
// before adding the new partition
    prev_avg_size = N/ (k−1)
// Pk is a new partition, i.e., an empty set of segments
// to which extracted segments are added
Pk = { }
// Loop 1 to the number of partitions from the previous
// iteration to add one new partition each iteration
    for i = 1 to k−1 {
        n_extract = floor ( n_needed / ( k−1 − i ) )
        if (i < k−1) { // not last
// if the existing partition did not include the average number
```

TABLE 1-continued

```
// of buckets, adjust the number of buckets to extract:
        if (size(Pi) > prev_avg_size) {
            n_extract++;
        }
        if (size(Pi) < (prev_avg_size−1)) {
            n_extract--;
        }
    }
// n_extract is the number buckets to extract from the i'th
// existing partition
// an empty set of segments that will contain a set of
// segments extracted from the i'th existing partition for
// the new partition Pk
    R = { }
    q = number segments in Pi
    Sort Si1...Siq (the segments composing Pi) from largest to
    smallest segment (i.e. so that Si1 is largest, Si2 next
    largest, etc.)
        for j = 1 to q {
        // Extract part of the segment
            if (size(Sij) > n_extract) {
// Slice off part of Sij to complete the extraction of segments
// for R Create two disjoint segments, X and Y
// whose union is Sij and where the length of Y is n_extract.
// This can be done in two ways, with Y containing smaller or
// larger integers than X. Without loss of generality,
// assume X contains the smaller integers.
                Remove Sij from Pi and replace it with segment X
                Add segment Y to R
                n_extract = 0;
            }
            // Extract the whole segment
            else {
                // Move segment Sij from Pi to R
                Remove Sij from Pi
                // i.e. R = Union(R, {Sij})
                Add Sij to R
                n_extract = n_extract − size(Sij)
            }
            If (n_extract=0) exit loop (for j...)
        }
// add the extracted buckets to the new partition
        Pk = Union(Pk,R)
// update the number of buckets to needed in the new partition
        n_needed = n_needed − size(R)
    }
}
```

Figure 3A:
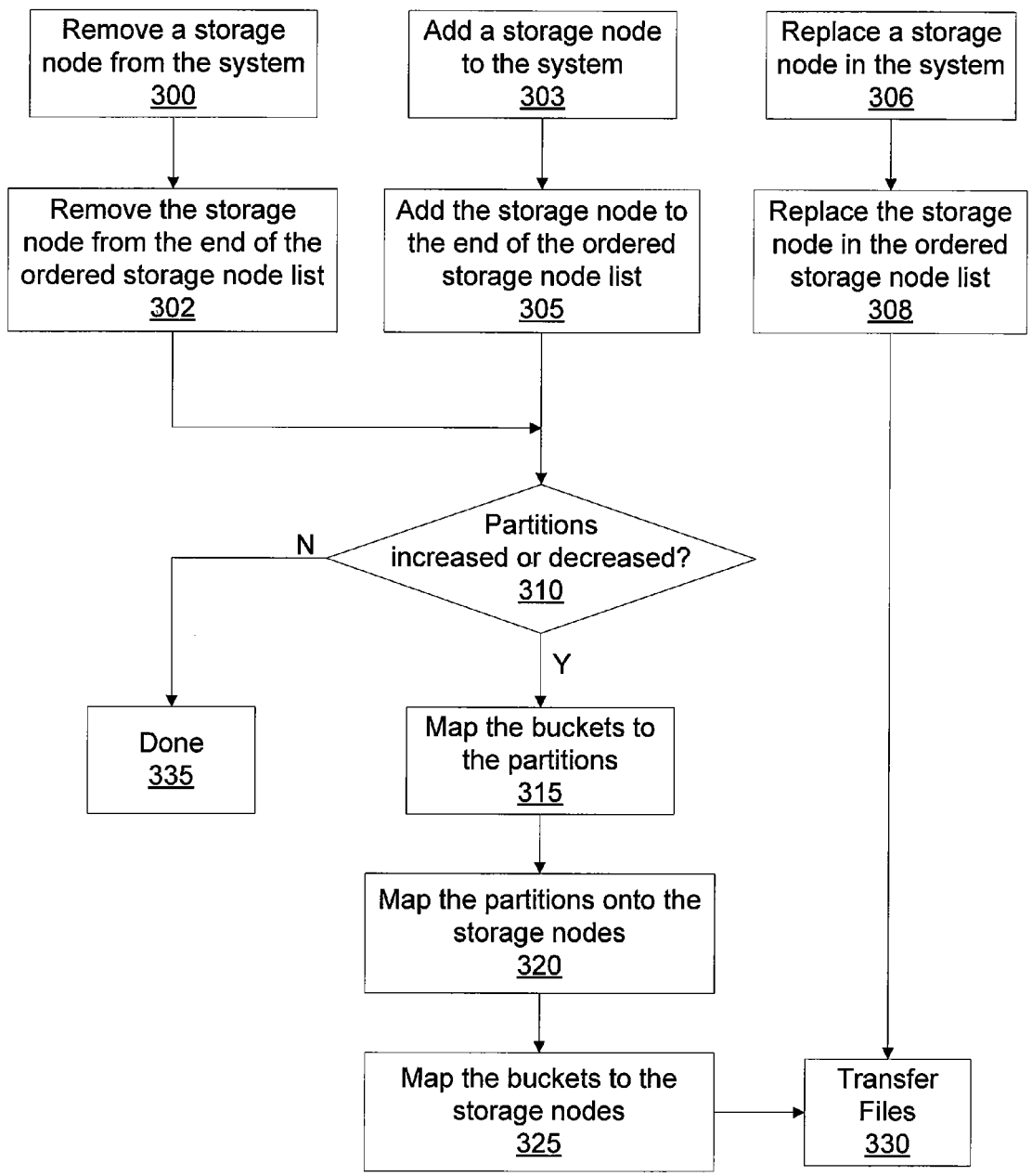
FIG. 3A is a flowchart of method steps for removing, adding, and replacing a storage node in the distributed storage system, according to different embodiments of the invention.

FIG. 3A is a flowchart of method steps for removing, adding, and replacing a storage node in the distributed storage system, according to different embodiments of the invention. The physical architecture of the distributed storage system may be changed during continuous operation through three commands: swap, add, and remove. These commands correspond to the administrative functions of hardware maintenance, scaling the size of the storage distributed storage system up, and scaling the size of the distributed storage system down, respectively. The swap command is used to swap any storage node with a new storage node, i.e., replace any machine with a new machine. The add command is used to add a storage node—always appended to the end of the ordered list of storage nodes so that the new node becomes the last logical node of the distributed storage system. The remove command is used to remove the last logical storage node from the distributed storage system. By restricting the administrative operations to three commands, the buckets of files may be optimally distributed to the storage nodes.

At step 300, the remove command is used to remove a storage node from the distributed storage system. At step 302, an existing storage node is removed from the end of the ordered storage node list and the remaining nodes proceed to step 310. Each node in the distributed storage system independently removes the storage node from the node's list when the storage node is detected as being absent.

At step 303, the add command is used to add a storage node to the distributed storage system. At step 305, a new storage node is added to the end of the ordered storage node list and the nodes, including the new storage node, proceed to step 310. Each node in the distributed storage system independently adds the new storage node to the node's list when the new storage node is detected as being present. Importantly, a client node may be added to, removed from, or swapped without updating the ordered storage node list. Therefore, no remapping of the buckets to storage nodes is ever needed when a new configuration of the distributed storage system only changes the number of client nodes. The distributed storage system may accommodate a changing workload, such as a rapidly increasing read load, in the presence of a slowly growing dataset without any management or inter-storage node communication overhead.

At step 306, the swap command is used to swap a new storage node into the distributed storage system to replace an existing storage node. At step 308, the new storage node replaces the existing storage node in the ordered storage node list and the nodes, including the new storage node, proceed to step 330. Each node in the distributed storage system independently adds the new storage node to the node's list when the new storage node is detected as replacing the removed storage node. When a swap command is executed the number of partitions is unchanged, and at step 330, files stored on the storage node that is removed are transferred to the new storage node to complete execution of the swap command.

The number of partitions may be changed when a new storage node is added to the distributed storage system or when an existing storage node is removed from the distributed storage system. At step 310, each node in the distributed storage system determines if the number of partitions has increased or decreased, and, if not, at step 335, execution of the add or remove command is complete. Otherwise, at step 315, the buckets are mapped to the partitions. At step 320, the partitions are then mapped to the storage nodes and at step 325 the buckets are mapped to the storage nodes.

Each storage node may then compare the old mapping to the new mapping to determine either the files that need to be transferred to the storage node from the storage node to be removed or the files the need to be transferred from the storage node to the new storage node that is added. When the files have been transferred either to the new storage node or from the storage node to be removed execution of the add or remove command, respectively, is complete. The bucket to storage node mapping ensures that the file transfer is minimal and that the work and bandwidth requirements are evenly distributed across the storage nodes. The minimal file transfer feature is shown in FIG. 2A as the number of partitions is increased or decreased. For example, when a fourth partition 234 is added to a distributed storage system the existing first partition 211, second partition 212, and third partition 213 each contribute approximately equal portions to the new fourth partition 234 to produce the new first partition 231, second partition 232, and third partition 233 that are each smaller. Importantly, no files are transferred between the existing partitions. Files are only transferred from each one of the existing partitions to the new partition and the new partition is fragmented in bucket space. Consequently, the bandwidth consumed for the file transfer and the work needed to add the new storage node is distributed across the existing storage nodes.

FIG. 3B is a table showing a partition to storage node mapping 345 for a distributed storage system including ten storage nodes, according to one embodiment of the invention. When a new storage node is added to a distributed storage system using no redundancy, the number of partitions may be simply incremented.

When redundancy is used and a new storage node is added the mapping of the partitions to the storage nodes is more complex. FIG. 3B shows the mapping when storage node 10 and partition 10 are added to a distributed storage system that includes 9 existing storage nodes and 9 partitions (see FIG. 2B for the mapping of 9 nodes and 9 partitions). When the tenth storage node is added, the mapping of partitions 8 and 9 (again, shown in FIG. 2B) to the storage nodes is changed such that partition 8 is mapped to new storage node 10, for the tertiary node, and partition 9 is mapped to new storage node 10, for the secondary node (as shown in FIG. 3B). New partition 10 is mapped to new storage node 10 for the primary node, to existing storage node 1 for the secondary node, and to existing storage node 2 for the tertiary node.

File Access

The mapping of buckets to storage nodes may be stored in a lookup table that is used by the client and storage nodes to perform file accesses (reads or writes). Alternatively, the mapping of buckets to storage nodes may be computed using the ordered list of storage nodes whenever a file access request is received from a client or storage node.

Figure 4:
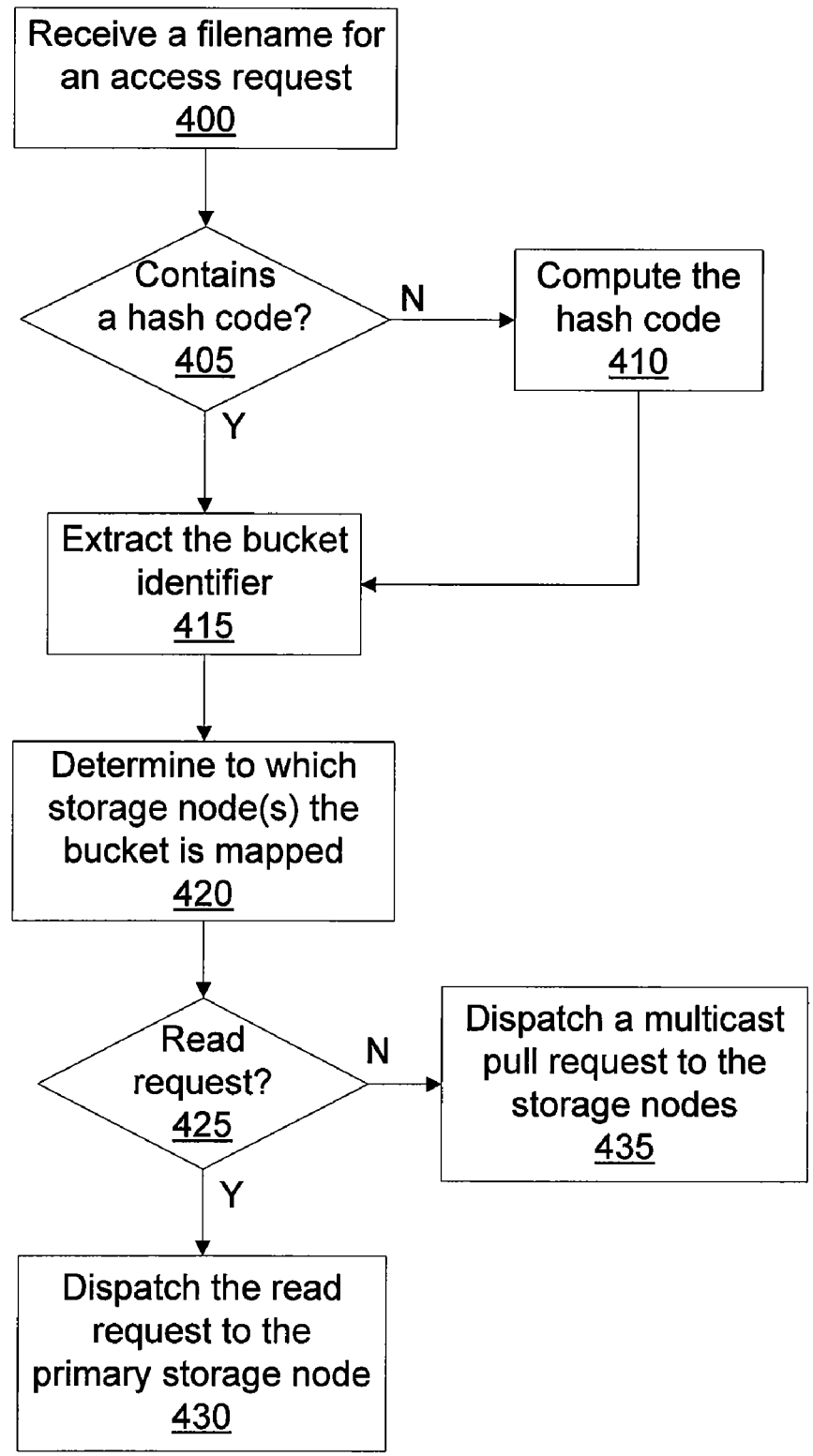
FIG. 4 is a flowchart of method steps for accessing a file that is stored on the distributed storage system, according to one embodiment of the invention.

FIG. 4 is a flowchart of method steps for accessing a file that is stored on the distributed storage system, according to one embodiment of the invention. At step 400, a filename is received by a client or storage node for an access request. At step 405 the receiving node determines if the filename contains a hash code. A hash code is generated by a function that uniformly maps a filename string to a range of numbers, producing unique identifiers that are evenly distributed within the range. In other embodiments, the hash code (or unique identifier) is provided using a different function.

If, at step 405, the receiving node determines that the filename does contain a hash code, then the receiving node proceeds directly to step 415. Otherwise, at step 410, the filename is used to compute the corresponding hash code. At step 415, the receiving node extracts the bucket identifier from a bit field of the hash code. In one embodiment the bucket identifier is extracted as the lowest twenty bits of the hash code, e.g., 0xfffff & hash code. At step 420, the receiving node determines to which storage node(s) the bucket identifier is mapped. At step 425, the receiving node determines if the access request is a read request, i.e., is not a write request. If the access request is a read request, then at step 430, the read request is dispatched by the receiving node to the primary storage node that was identified in step 420.

If the access request is a write request, then at step 435, a multicast pull request is dispatched by the receiving node to the storage node(s), e.g., primary, secondary, tertiary, etc., that were identified in step 420. Each of the storage node(s) identified in step 420 then independently "pulls" the file from the local storage on the node that received the access request in step 400. The distributed storage system is a messaging file system in that all non-local file system operations are effected by sending message to the nodes in the distributed storage system. Messages, such as a multicast pull request, may be multicast to an arbitrary subset of the nodes. In one embodiment, the messaging system is implemented using the SPREAD toolkit, a third party messaging framework that implements a "safe" messaging protocol. In this context safe refers to the notion that messages are guaranteed to arrive in the same order at all recipient nodes. This in turn enables the management of distributed state in that it provides a framework in which state updates can be guaranteed to be applied consistently across the distributed storage system.

In one embodiment the distributed storage system employs a strict pull architecture for the transport of data between nodes to satisfy local file system operations. The term strict pull architecture implies that all file transport operations are "copy from" as opposed to "copy to." To effect write operations to non-local storage the initiating node (node that receives the access request at step 400) writes the file to a temporary local data store and multicasts a pull instructions to the nodes assigned to permanently host the data. As previously described, the storage nodes then pull the files to complete the write operation. The use of a strict pull architecture implies that write operations are non-local, thereby obviating issues pertaining to non-local write permissions. The strict pull architecture allows the use of a broader spectrum of file transport options, specifically pull only protocols. The strict pull architecture also enables concurrent pull operations to leverage transport cache layers while providing an intrinsic alternative to back pressure from target storage nodes being written to. In other words, in a push architecture an explicit mechanism by which the target of a write operation can exert back pressure on the node initiating the write must be provided in order to avoid data loss in the event of network congestion or process load that prevents successful completion of the write operation. The pull architecture advantageously avoids the need for handling back pressure from target storage nodes by localizing the effect of a write request to the storage nodes, thereby enabling implicit throttling in the event of high process load by way of process scheduling at the operating system level and analogously by slowing the local pull rate in the event of network congestion.

In addition to using a strict pull architecture, the distributed storage system is a homogeneous architecture since each node, client or storage, may use identical application software to implement the distributed storage system. In contrast, the hardware for each node may be heterogeneous, allowing different machines to participate in the distributed storage system. There is no administration node or master/slave relationship between nodes. Administrative functionality that requires synchronization across the cluster is accomplished by cooperative messaging. Consequently, it is possible to scale the size of the distributed storage system without increasing the number of storage nodes by simply adding client nodes, i.e., nodes that have no buckets assigned to them. The client nodes extend the read capacity of the distributed storage system by leveraging frontside and disk cache layers without modifying the storage nodes.

The messages that are transmitted between nodes may be implemented as serializable C++ objects and may carry both state and executable instructions. Objects may be serialized through an abstract message interface and then broadcast via UDP multicast to a set of storage nodes via a third party messaging protocol, such as the open source SPREAD toolkit. Upon receipt by a target node, the message is deserialized and then the intended effect is invoked via an abstract method that is part of the abstract message interface. The localization of message state and executable code to the implementation of a single interface implies easy extensibility and low semantic distance. The abstract messaging interface may be optionally extended with an abstract synchronization interface. The synchronization interface implements a callback or timeout on the node from which the message originated. For example, in the case of the pull request message, the synchronization interface releases the local write operation when the synchronization interface receives a call back or the synchronization interface registers an error in the event of timeout. The non-local callback is effected by assigning each synchronization object a global unique identifier (GUID) and caching a reference to the message object in a synchronization hash map at the origination point. The abstract synchronization object implements a "remove self" operation that occurs after the timeout period has elapsed or the synchronization object can be satisfied by the "action" method of a callback message carrying the original GUID as part of its state.

Figure 5:
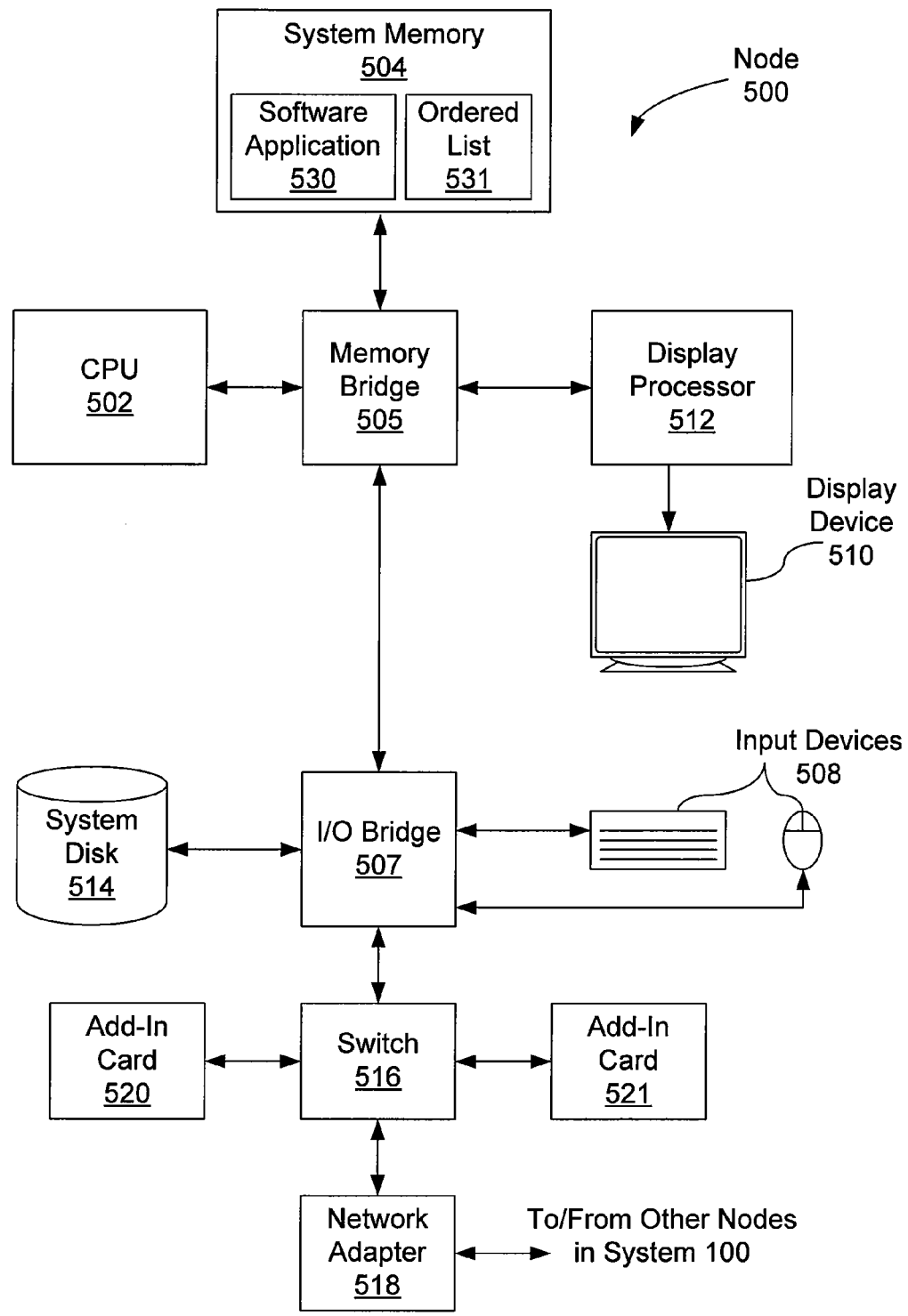
FIG. 5 is a block diagram of a storage node or a client node 500, according to one embodiment of the invention.

FIG. 5 is a block diagram of a storage node or a client node 500 that is configured to implement one or more aspects of the present invention. Node 500 may be a computer workstation, personal computer, video game console, personal digital assistant, rendering engine, mobile phone, hand held device, smart phone, super-smart phone, or any other device suitable for practicing one or more embodiments of the present invention. As shown, node 500 includes one or more processing units, such as central processing unit (CPU) 502, and a system memory 504 communicating via a bus path that may include a memory bridge 505. CPU 502 includes one or more processing cores, and, in operation, CPU 502 is the master processor of node 500, controlling and coordinating operations of other system components.

System memory 504 stores software applications and data for use by CPU 502. CPU 502 runs software applications and optionally an operating system. In particular, a software application configured to implement the distributed storage system may be stored in the system memory 504. Additionally, the ordered list of storage nodes 531 and one or more lookup tables mapping buckets to partitions, partitions to nodes, and/or buckets to nodes may also be stored in the system memory 504.

Memory bridge 505, which may be, e.g., a Northbridge chip, is connected via a bus or other communication path (e.g., a HyperTransport link) to an I/O (input/output) bridge 507. I/O bridge 507, which may be, e.g., a Southbridge chip, receives user input from one or more user input devices 508 (e.g., keyboard, mouse, digital pen, joystick, digitizer tablets, touch pads, touch screens, still or video cameras, motion sensors, and/or microphones) and forwards the input to CPU 502 via memory bridge 505.

One or more display processors, such as display processor 512, may be coupled to memory bridge 505 via a bus or other communication path (e.g., a PCI Express, Accelerated Graphics Port, or HyperTransport link). The display processor 512 periodically delivers pixels to a display device 510 (e.g., a screen or conventional CRT, plasma, OLED, SED or LCD based monitor or television).

A system disk 514 is also connected to I/O bridge 507 and may be configured to store content and applications and data for use by CPU 502 and display processor 512. System disk 514 provides non-volatile storage for applications and data and may include fixed or removable hard disk drives, flash memory devices, and CD-ROM, DVD-ROM, Blu-ray, HD-DVD, or other magnetic, optical, or solid state storage devices. When at least a portion of the storage capacity of the system disk 514 is included in the global storage of the distributed storage system, the node 500 is a storage node that is included in the ordered list of storage nodes 531.

A switch 516 provides connections between I/O bridge 507 and other components such as a network adapter 518 and various add-in cards 520 and 521. Network adapter 518 allows node 500 to communicate with other systems via an electronic communications network, and may include wired or wireless communication over local area networks and wide area networks such as the Internet. In particular, network adapter 518 is configured to transmit data and messages between the node 500 and other nodes in the distributed storage system 100.

Other components (not shown), including USB or other port connections, may also be connected to I/O bridge 507. Communication paths interconnecting the various components in FIG. 5 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

It will be appreciated that the system shown herein is illustrative and that variations and modifications are possible. The connection topology, including the number and arrangement of bridges, may be modified as desired. For instance, in some embodiments, system memory 504 may be connected to CPU 502 directly rather than through a bridge, and other devices may communicate with system memory 504 via memory bridge 505 and CPU 502. In other alternative topologies display processor 512 may be connected to I/O bridge 507 or directly to CPU 502, rather than to memory bridge 505. In still other embodiments, I/O bridge 507 and memory bridge 505 may be integrated in a single chip. In addition, the particular components shown herein are optional. For instance, any number of add-in cards or peripheral devices might be supported. In some embodiments, switch 516 is eliminated, and network adapter 518 and add-in cards 520, 521 connect directly to I/O bridge 507.

The described distributed storage system is specifically adapted for the storage of large volumes of UGC (user generated content). One advantage of the distributed storage system is the ability to scale the system horizontally using commodity (off the shelf) heterogeneous hardware and while being tolerant when configured to store multiple, redundant copies of the data. Further, the administrative operations for adding, removing, and swapping storage nodes are simplified through the use of the ordered list of storage nodes. Each one of the nodes may independently compute a new mapping of files to the storage nodes when the ordered list is changed using identical software so that the system is software homogeneous. Additionally, the volume of data transfers needed to complete the redistribution of data as the system is reconfigured is minimized.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for accessing files that are distributed across multiple storage nodes in a distributed storage system, the method comprising:
   receiving an access request identifying a first distributed file having an associated filename;
   determining, based on the filename, a bucket identifier corresponding to a first one of a plurality of buckets that contains the first distributed file, comprising:
      upon determining that the filename is not associated with a predefined hash code:
         computing a hash code using the filename; and
         extracting the bucket identifier from a bit field of the computed hash code,
      wherein each of the plurality of buckets maps to a respective one or more of a plurality of partitions containing the distributed files, and
      wherein each of the plurality of partitions is stored across a respective one or more of the multiple storage nodes in the distributed storage system;
   determining a first one or more partitions from the plurality of partitions that the first bucket maps to, wherein at least one of the first one or more partitions contains the first distributed file;
   determining, based on a mapping of the first one or more partitions to the one or more storage nodes, a first storage node that stores the first distributed file; and
   dispatching a request to the first storage node to access the first distributed file.

2. The method of claim 1, wherein the distributed files are read and written by a client node that is coupled to the multiple storage nodes and does not store any of the distributed files.

3. The method of claim 2, wherein each of the client node and the multiple storage nodes stores an ordered list of the storage nodes that is used to compute a mapping of the bucket and other buckets to the multiple storage nodes.

4. The method of claim 1, wherein the access request is received from a client node and the dispatching comprises:
   determining that the access request is a write request; and
   reading, by the first storage node, the first distributed file from the client node in response to the dispatched request.

5. The method of claim 4, further comprising the steps of:
   determining, based on the mapping of the bucket to the multiple storage nodes, a second storage node that also stores the first distributed file;
   dispatching the request to the second storage node; and
   reading, by the second storage node, the first distributed file from the client node in response to the dispatched request.

6. The method of claim 5, wherein the dispatched request is multicast to the first storage node and the second storage node.

7. The method of claim 1, further comprising:
   upon determining that the filename is associated with a second predefined hash code, extracting the bucket identifier from a bit field of the predefined hash code.

8. The method of claim 1, wherein the multiple storage nodes include one or more heterogeneous machines.

9. A system for accessing files that are distributed across multiple storage nodes in a distributed storage system, the system comprising:

a first storage node of the multiple storage nodes, the first storage node storing a first distributed file; and a client node that is coupled to the multiple storage nodes and configured to:

receive an access request identifying a first distributed file having an associated filename;

determine, based on the filename, a bucket identifier corresponding to a first one of a plurality of buckets that contains the first distributed file, comprising:

upon determining that the filename is not associated with a predefined hash code:

compute a hash code using the filename; and extract the bucket identifier from a bit field of the computed hash code, wherein each of the plurality of buckets maps to a respective one or more of a plurality of partitions containing the distributed files, and wherein each of the plurality of partitions is stored across a respective one or more of the multiple storage nodes in the distributed storage system;

determine a first one or more partitions from the plurality of partitions that the first bucket maps to, wherein at least one of the first one or more partitions contains the first distributed file;

determine, based on a mapping of the first one or more partitions to the one or more storage nodes, a first storage node that stores the first distributed file; and dispatch a request to the first storage node to access the first distributed file.

10. The system of claim 9, wherein the client node is further configured to determine that the access request is a write request and the first storage node is configured to read the first distributed file from the client node in response to the dispatched request.

11. The system of claim 10, further comprising a second storage node that also stores the first distributed file, wherein the client node is further configured to:

determine, based on the mapping of the bucket to the multiple storage nodes, that the second storage node also stores the first distributed file; and dispatch the request to the second storage node, and the second storage node is configured to read the first distributed file from the client node in response to the dispatched request.

12. The system of claim 11, wherein the dispatched request is multicast to the first storage node and the second storage node.

13. The system of claim 9, further comprising:

upon determining that the filename is associated with a second predefined hash code, extracting the bucket identifier from a bit field of the predefined hash code.

14. The system of claim 9, wherein the multiple storage nodes include one or more heterogeneous machines.

15. The system of claim 9, wherein each of the client node and the multiple storage nodes stores an ordered list of the storage nodes that is used to compute the mapping of the bucket and other buckets to the multiple storage nodes.

16. A computer-readable storage medium storing instructions that, when executed by a processor, cause a computer system to access files that are distributed across multiple storage nodes in a distributed storage system, by performing the steps of:

receiving an access request identifying a first distributed file having an associated filename;

determining, based on the filename, a bucket identifier corresponding to a first one of a plurality of buckets that contains the first distributed file, comprising:

upon determining that the filename is not associated with a predefined hash code:

computing a hash code using the filename; and extracting the bucket identifier from a bit field of the computed hash code, wherein each of the plurality of buckets maps to a respective one or more of a plurality of partitions containing the distributed files, and wherein each of the plurality of partitions is stored across a respective one or more of the multiple storage nodes in the distributed storage system;

determining a first one or more partitions from the plurality of partitions that the first bucket maps to, wherein at least one of the first one or more partitions contains the first distributed file;

determining, based on a mapping of the first one or more partitions to the one or more storage nodes, a first storage node that stores the first distributed file; and dispatching a request to the first storage node to access the first distributed file.

17. The computer-readable storage medium of claim 16, wherein the access request is received from a client node and the dispatching comprises:

determining that the access request is a write request; and reading, by the first storage node, the first distributed file from the client node in response to the dispatched request.

18. The computer-readable storage medium of claim 17, further comprising the steps of:

determining, based on the mapping of the bucket to the multiple storage nodes, a second storage node that also stores the first distributed file;

dispatching the request to the second storage node; and reading, by the second storage node, the first distributed file from the client node in response to the dispatched request.

* * * * *